(12) United States Patent
Koike

(10) Patent No.: US 7,852,736 B2
(45) Date of Patent: Dec. 14, 2010

(54) OPTICAL ELEMENT HAVING ABERRATION CORRECTION AND OPTICAL PICKUP AND OPTICAL INFORMATION RECORDING AND/OR REPRODUCING APPARATUS EQUIPPED THEREWITH

(75) Inventor: Katsuhiro Koike, Saitama (JP)

(73) Assignee: Pioneer Corporation, Tokyo (JP)

( * ) Notice: Subject to any disclaimer, the term of this patent is extended or adjusted under 35 U.S.C. 154(b) by 672 days.

(21) Appl. No.: 10/588,844

(22) PCT Filed: Jan. 14, 2005

(86) PCT No.: PCT/JP2005/000356

§ 371 (c)(1),
(2), (4) Date: Sep. 8, 2006

(87) PCT Pub. No.: WO2005/076266

PCT Pub. Date: Aug. 18, 2005

(65) Prior Publication Data

US 2007/0183296 A1    Aug. 9, 2007

(30) Foreign Application Priority Data

Feb. 9, 2004    (JP) .............................. 2004-032050

(51) Int. Cl.
*G11B 7/135*    (2006.01)
(52) U.S. Cl. ................................. 369/112.07
(58) Field of Classification Search ............ 369/112.07, 369/112.1, 112.12, 112.15, 112.26
See application file for complete search history.

(56) References Cited

U.S. PATENT DOCUMENTS

| | | | |
|---|---|---|---|
| 6,084,843 A * | 7/2000 | Abe et al. ............... | 369/112.07 |
| 7,206,275 B2 | 4/2007 | Saitoh et al. | |
| 7,414,951 B2 | 8/2008 | Katayama | |
| 7,443,778 B2 | 10/2008 | Komma | |
| 2002/0181366 A1 | 12/2002 | Katayama | |
| 2003/0185134 A1* | 10/2003 | Kimura et al. ......... | 369/112.08 |

(Continued)

FOREIGN PATENT DOCUMENTS

EP        1 304 689 A      4/2003

(Continued)

OTHER PUBLICATIONS

International Search Report of PCT/JP2005/000356 mailed on May 24, 2005.

*Primary Examiner*—Brian E Miller
*Assistant Examiner*—Mark L Fischer
(74) *Attorney, Agent, or Firm*—Nixon & Vanderhye PC

(57) ABSTRACT

An optical element (10) includes a spherical aberration correction hologram (14) and a color aberration correction hologram (15). For a first laser light requiring the greatest valid diameter, no affect is given to the wave front in either of the aberration correction holograms. However, for a second laser light requiring the second greatest valid diameter, the valid diameter is narrowed down by the spherical aberration correction hologram (14). For a third laser light requiring the smallest valid diameter, the valid diameter is narrowed down to a predetermined amount by the diffusion light coming and the spherical aberration correction hologram (14) and further the valid diameter is narrowed down by the selective diffraction of the light flux incident in the annular area B of the color aberration correction hologram (15) and its diffusion.

8 Claims, 7 Drawing Sheets

U.S. PATENT DOCUMENTS

| | | |
|---|---|---|
| 2004/0170106 A1 | 9/2004 | Komma |
| 2005/0047313 A1 | 3/2005 | Saitoh et al. |
| 2005/0105447 A1* | 5/2005 | Ikenaka et al. ......... 369/112.06 |
| 2006/0104187 A1 | 5/2006 | Katayama |
| 2007/0258144 A1 | 11/2007 | Kimura et al. |
| 2008/0267046 A1 | 10/2008 | Komma |
| 2008/0273445 A1 | 11/2008 | Katayama |
| 2009/0016198 A1 | 1/2009 | Katayama |

FOREIGN PATENT DOCUMENTS

| | | |
|---|---|---|
| JP | 2003-067972 A1 | 3/2003 |
| JP | 2003-288733 A | 10/2003 |
| JP | 2003288733 A * | 10/2003 |
| JP | 2004-281034 A | 10/2004 |
| JP | 2005-071462 A | 3/2005 |

* cited by examiner

[FIG. 1]
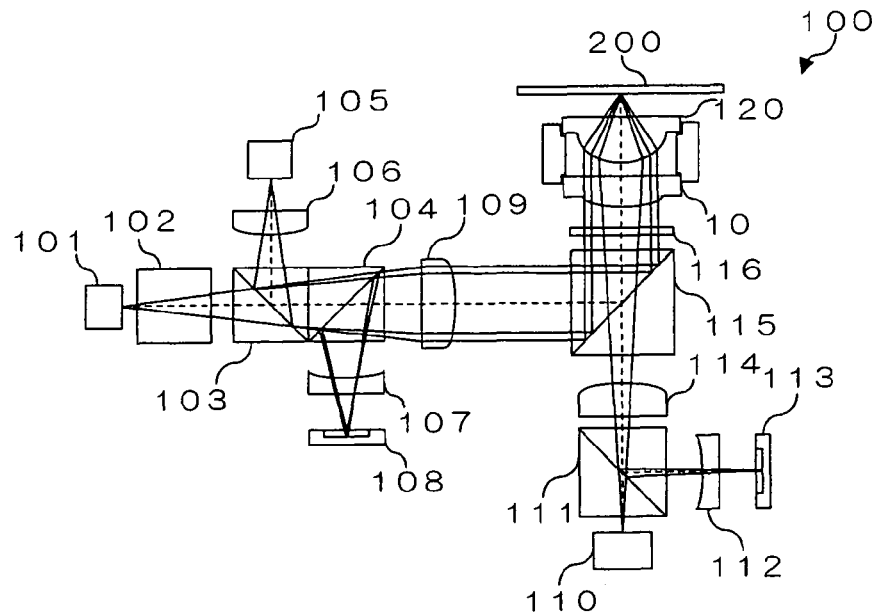
[FIG. 2]
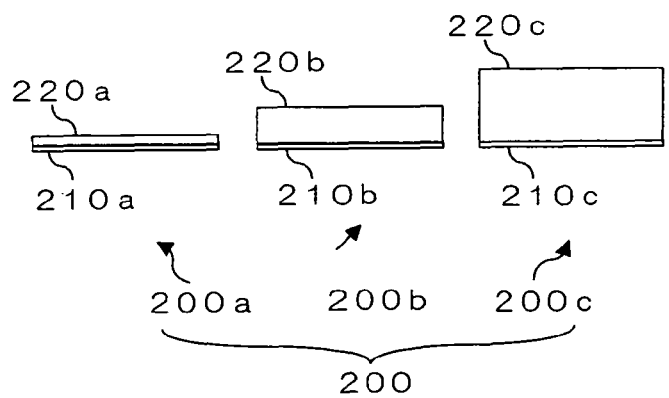
[FIG. 3]
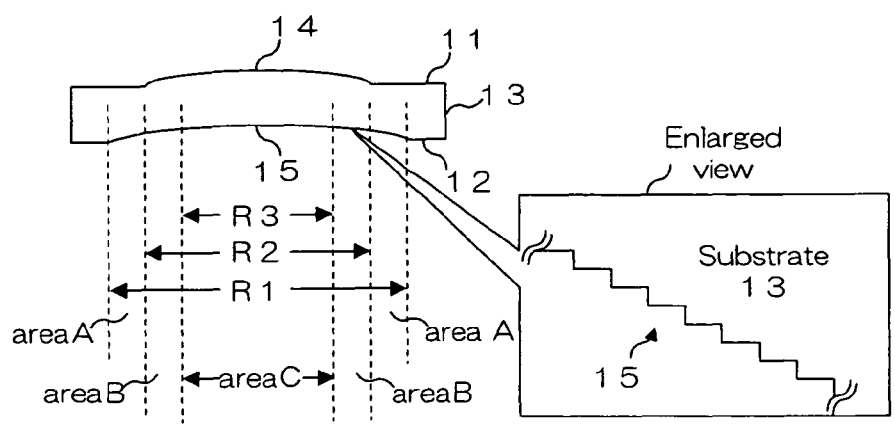

[FIG. 4]
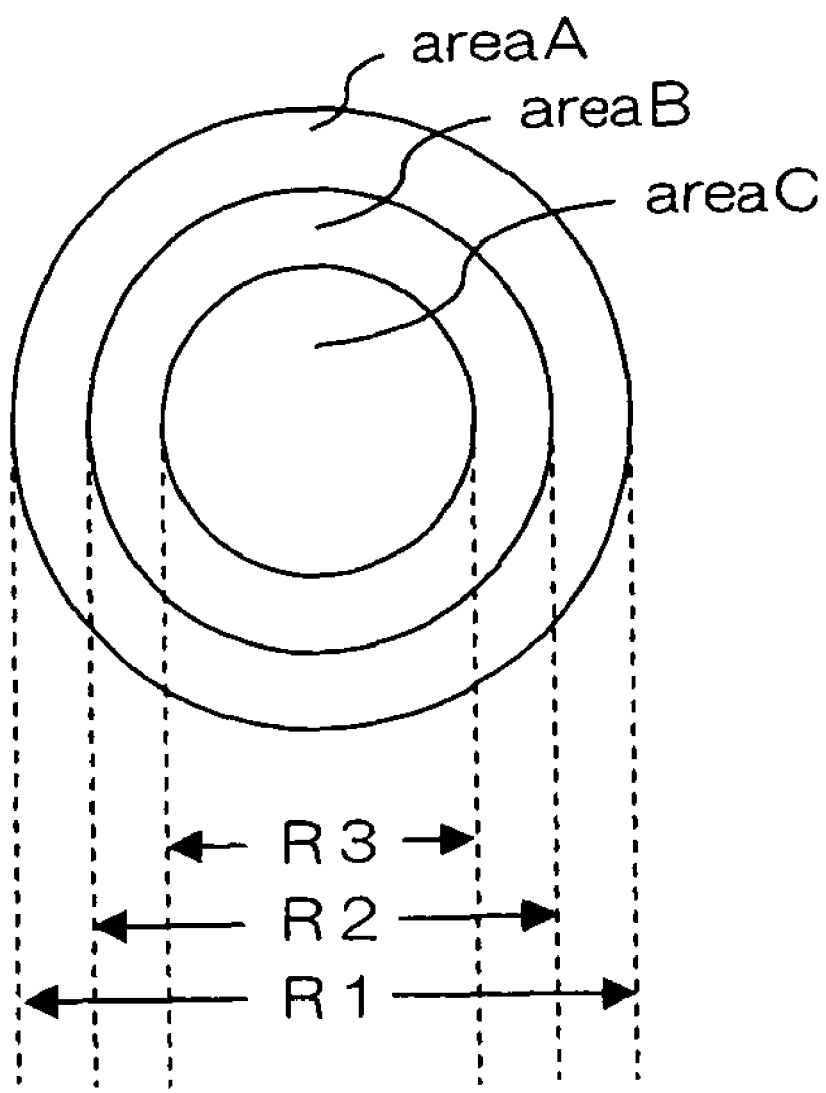

[FIG. 5]
(a)
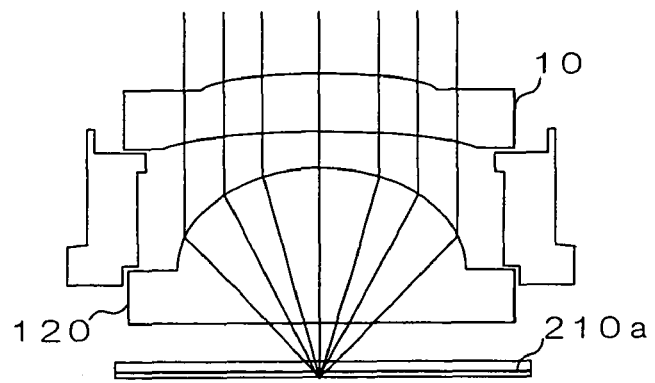
(b)
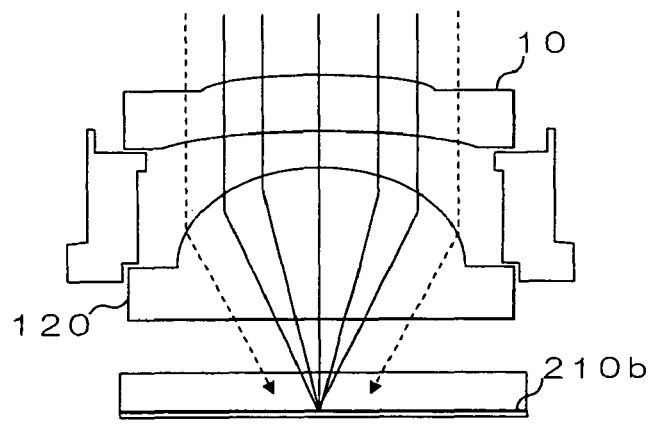
(c)
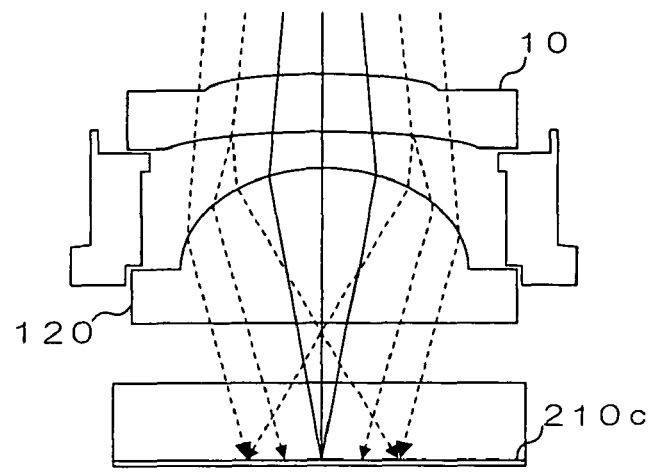

[FIG. 6]
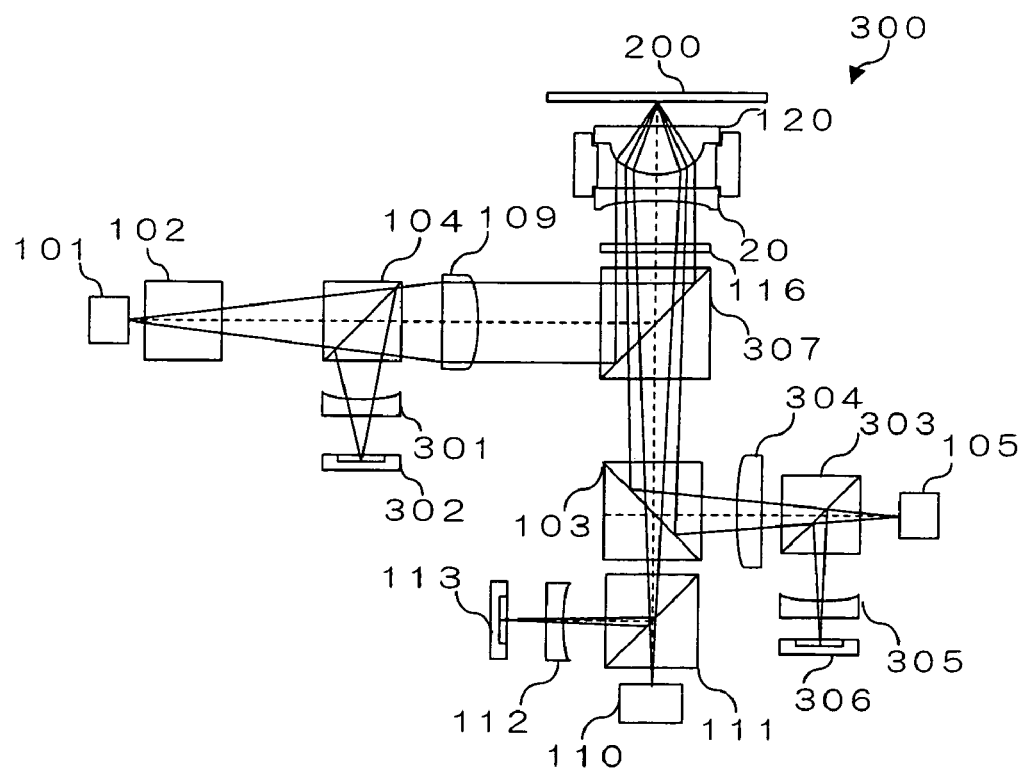

[FIG. 7]
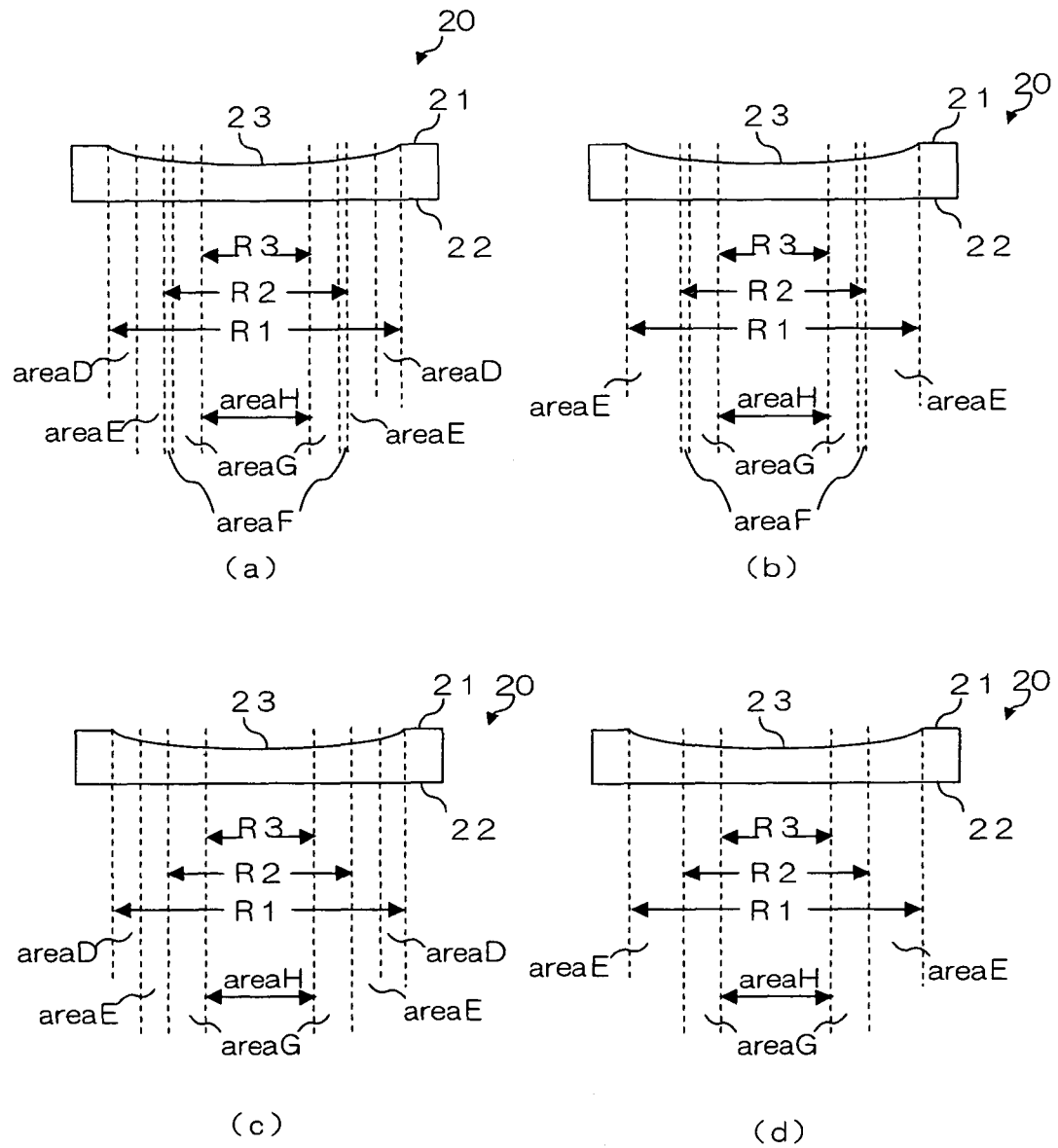

[FIG. 8]
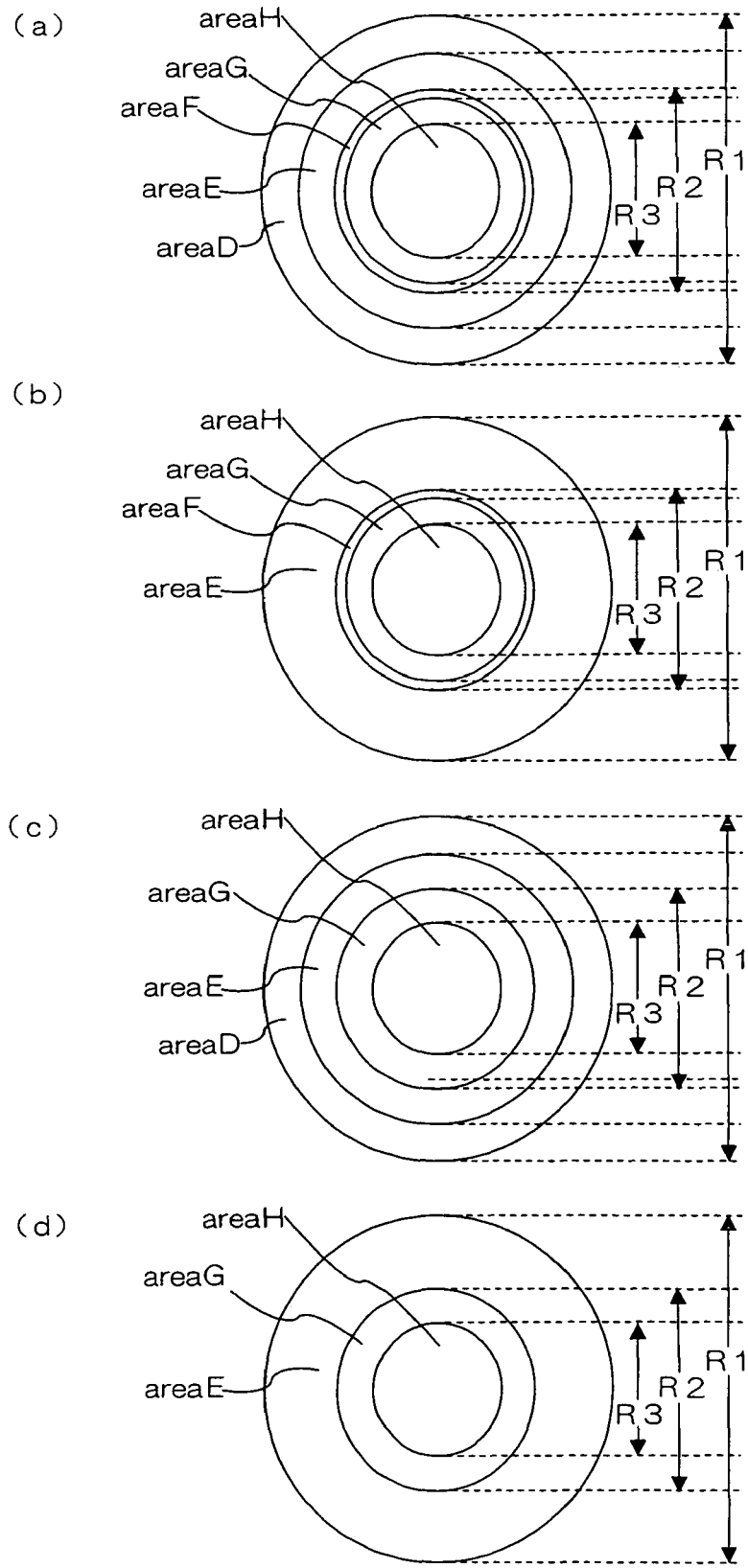

[FIG. 9]
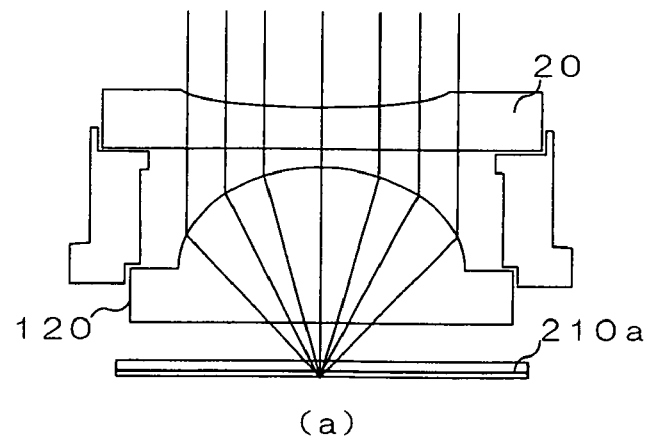
(a)
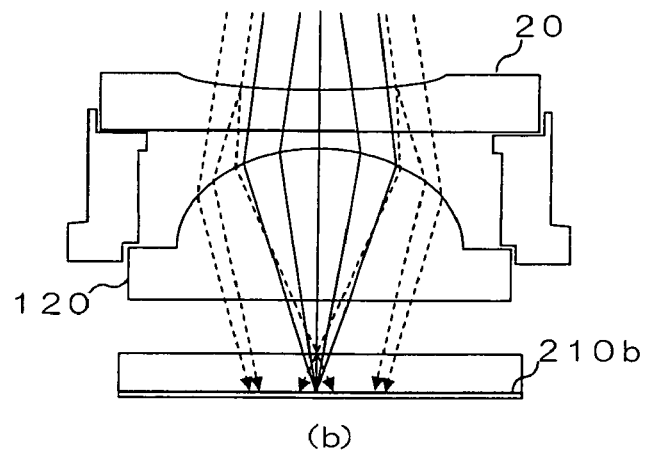
(b)
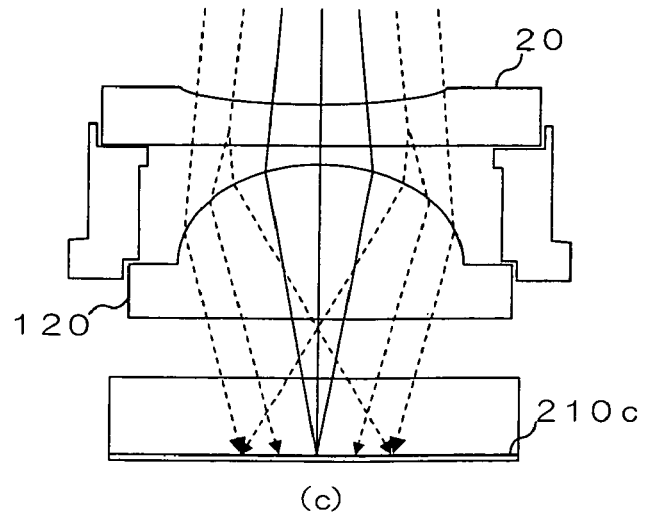
(c)

ered by chromatic aberration. Thus, in
OPTICAL ELEMENT HAVING ABERRATION CORRECTION AND OPTICAL PICKUP AND OPTICAL INFORMATION RECORDING AND/OR REPRODUCING APPARATUS EQUIPPED THEREWITH This application is the US national phase of international application PCT/JP2005/00356, filed 14 Jan. 2005, which designated the U.S. and claims priority of JP 2004-032050, filed 9 Feb. 2004, the entire contents of each of which are hereby incorporated by reference.

TECHNICAL FIELD

The present invention relates to an optical element, an optical pickup, and an information recording/reproducing apparatus, in which an objective lens can be shared among a plurality of types of recording media on which writing and reading are performed by using laser light, for example.

BACKGROUND ART

Such an optical element is disposed on the optical path of the laser light, which corresponds to each of the plurality of types of recording media, in order to share the objective lens and the optical pickup or the like among the plurality of types of recording media which have mutually different optical characteristics, such as a distance between a substrate surface and a recording layer, and a recording density. As one example of the optical element, there is proposed an optical element which realizes compatibility of the objective lens among the plurality of types of recording media by using diffraction (e.g. refer to a patent document 1).

In the optical pickup, diffraction orbicular zones are provided, and a luminous flux is flared on the outer side of a predetermined numerical aperture in a use condition on the side that the numerical aperture is smaller. Therefore, it is considered that a beam diameter is not narrowed down too much, and that information can be recorded and reproduced with respect to the plurality of types of recording media which mutually differ in thickness.

Patent document 1: Japanese Patent Application Laying Open NO. 2001-235676

DISCLOSURE OF INVENTION

Object to be Solved by the Invention

However, the conventional optical element has a problem exemplified below.

Namely, there is a tendency to increase the number of types of recording media, and moreover, there is a remarkable requirement for the miniaturization of the optical pickup including the optical element or the like. In this situation, in the conventional optical element, the diffraction orbicular zones do not have an effective structure with respect to three or more types of recording media, so that it is impossible in practice to maintain good recording characteristics with respect to the three or more types of recording media. Moreover, along with the density growth of the recording density, the numerical aperture of the objective lens tends to increase and is easily influenced by chromatic aberration. Thus, in order to maintain good recording characteristics, it is necessary to separately provide a lens for chromatic aberration correction, on the optical path.

In order to solve the above-mentioned conventional problem, it is therefore an object of the present invention to provide an optical element, an optical pickup, and an information recording/reproducing apparatus, in which an objective lens can be shared among three or more types of recording media.

Means for Solving the Object

The above object of the present invention can be achieved by a first optical element having an incident plane and an exit plane of first laser light and a plurality of laser lights, which has a different wavelength from that of the first laser light, on an optical path of the first laser light and the plurality of laser lights, in order to share an objective lens for focusing light on a first recording medium provided with a recording layer, which receives the first laser light through a transmission protection layer with a thickness of D1, in the plurality of laser lights and in a plurality of recording media corresponding to the respective plurality of laser lights, the plurality of laser lights including second laser light, corresponding to a second recording medium having a transmission protection layer with a thickness of D2 (D2>D1), and third laser light, corresponding to a third recording medium having a transmission protection layer with a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, the optical element provided with: a first aberration correcting device for correcting aberration caused by a difference between the thickness D1 of the transmission protection layer and the thickness D2 of the transmission protection layer and aberration caused by a difference in wavelength between the first laser light and the second laser light and for selectively reducing the effective diameter of the luminous flux which enters the objective lens to a value corresponding to the effective diameter R2, with respect to the second laser light and the third laser light; a second aberration correcting device for correcting aberration of the objective lens caused by an amount of change if a wavelength is changed in the first laser light, the second laser light, or the third laser light; and a third aberration correcting device, which is disposed in association with the effective diameter R2 and the effective diameter R3, for correcting aberration of the objective lens caused by an amount of change if a wavelength is changed in the first laser light and the second laser light and for selectively diffusing the incident third laser light if the third laser light enters the third aberration correcting device.

The above object of the present invention can be also achieved by a second optical element having an incident plane and an exit plane of first laser light and a plurality of laser lights, which has a different wavelength from that of the first laser light, on an optical path of the first laser light and the plurality of laser lights, in order to share an objective lens for focusing light on a first recording medium provided with a recording layer, which receives the first laser light through a transmission protection layer with a thickness of D1, in the plurality of laser lights and in a plurality of recording media corresponding to the respective plurality of laser lights, the plurality of laser lights including second laser light, corresponding to a second recording medium having a transmission protection layer with a thickness of D2 (D2>D1) and used in a finite system, and third laser light, corresponding to a third recording medium having a transmission protection layer with a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, the optical element provided with: a fourth aberration correcting device for correcting aberration of the objective lens caused by an amount of change if a wavelength is changed in the first laser light, the second laser light, or the third laser light; a fifth aberration correcting device, which is disposed in association with the effective diameter R1 and the effective diameter R2, for correcting aberration of the objective lens caused by an amount of change if a wavelength is changed in the first laser light and the third laser light and for selectively diffusing the incident second laser light if the second laser light enters the fifth aberration correcting device; and a sixth aberration correcting device, which is disposed in association with the effective diameter R2 and the effective diameter R3, for correcting aberration of the objective lens caused by an amount of change if a wavelength is changed in the first laser light and the second laser light and for selectively diffusing the incident third laser light if the third laser light enters the sixth aberration correcting device.

The above object of the present invention can be also achieved by an optical pickup provided with the above-mentioned first or second optical element of the present invention.

The above object of the present invention can be also achieved by an optical information recording/reproducing apparatus provided with the above-mentioned first or second optical pickup of the present invention.

BRIEF DESCRIPTION OF DRAWINGS

FIG. 1 is a diagram showing a structural example of an optical pickup 100 in a first example of the present invention.

FIG. 2 is an explanatory diagram showing a recording medium 200 in the first example of the present invention.

FIG. 3 is a cross sectional view showing an optical element 10 in the first example of the present invention.

FIG. 4 is a plan view showing a hologram 15 for chromatic aberration correction in the optical element 10.

FIG. 5 are diagrams illustrating the state of focusing of each laser light in the optical element 10.

FIG. 6 is a diagram showing a structural example of an optical pickup 300 in a second example of the present invention.

FIG. 7 are cross sectional views showing an optical element 20 in the second example of the present invention.

FIG. 8 are plan views showing a hologram 23 for chromatic aberration correction in the optical element 20.

FIG. 9 are diagrams illustrating the state of focusing of each laser light in the optical element 20.

DESCRIPTION OF REFERENCE CODES

10 . . . optical element, 11 . . . incident plane, 12 . . . exit plane, 13 . . . base material, 14 . . . hologram for spherical aberration correction, 15 . . . hologram for chromatic aberration correction, 20 . . . optical element, 21 . . . incident plane, 22 . . . exit plane, 23 . . . hologram for chromatic aberration correction, 100 . . . optical pickup, 200 . . . recording medium, 300 . . . optical pickup.

BEST MODE FOR CARRYING OUT THE INVENTION

First Embodiment of Optical Element

The first embodiment of the optical element is an optical element having an incident plane and an exit plane of first laser light and a plurality of laser lights, which has a different wavelength from that of the first laser light, on an optical path of the first laser light and the plurality of laser lights, in order to share an objective lens for focusing light on a first recording medium provided with a recording layer, which receives the first laser light through a transmission protection layer with a thickness of D1, in the plurality of laser lights and in a plurality of recording media corresponding to the respective plurality of laser lights, the plurality of laser lights including second laser light, corresponding to a second recording medium having a transmission protection layer with a thickness of D2 (D2>D1), and third laser light, corresponding to a third recording medium having a transmission protection layer with a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, the optical element provided with: a first aberration correcting device for correcting aberration caused by a difference between the thickness D1 of the transmission protection layer and the thickness D2 of the transmission protection layer and aberration caused by a difference in wavelength between the first laser light and the second laser light and for selectively reducing the effective diameter of the luminous flux which enters the objective lens to a value corresponding to the effective diameter R2, with respect to the second laser light and the third laser light; a second aberration correcting device for correcting aberration of the objective lens caused by an amount of change if a wavelength is changed in the first laser light, the second laser light, or the third laser light; and a third aberration correcting device, which is disposed in association with the effective diameter R2 and the effective diameter R3, for correcting aberration of the objective lens caused by an amount of change if a wavelength is changed in the first laser light and the second laser light and for selectively diffusing the incident third laser light if the third laser light enters the third aberration correcting device.

The "transmission protection layer" described herein mainly indicates a substrate.

The "aberration" described herein is mainly spherical aberration and chromatic aberration.

The "effective diameter" described herein is a concept which indicates the diameter of the luminous flux which contributes to the focusing by the objective lens.

According to the optical element, by the first aberration correcting device, the aberration caused by the difference in thickness between the transmission protection layer of the first recording medium and the transmission protection layer of the second recording medium and the aberration caused by the difference in wavelength between the first laser light and the second laser light are corrected, and the effective diameters of the second laser light and the third laser light are reduced. Moreover, since the third laser light is used in the finite system, aberration caused by a difference in thickness between the transmission protection layer of the first recording medium and the transmission protection layer of the third recording medium is also corrected. Moreover, by the second aberration correcting device, the aberration generated in the objective lens is also corrected if a wavelength is changed in the plurality of laser lights. Moreover, by the third aberration correcting device, the third laser light is selectively diffused. Therefore, it is possible to share the objective lens in a simple structure among three or more recording media.

In one aspect of the first embodiment of the optical element, at least one of the second and third aberration correcting devices is a diffraction pattern in which a plurality of phase steps (or steps of phase difference) are formed in association with each wavelength of the first laser light, the second laser light, and the third laser light.

The "diffraction pattern" described herein is a concept which indicates something which can diffract incident light, such as concavo-convex or light and dark cross stripes, diffraction grating, and an element having them formed thereon.

According to this aspect, at least one of the second and third aberration correcting devices is formed as the diffraction pattern, so that it is possible to easily construct these devices.

In another aspect of the first embodiment of the optical element, the diffraction pattern is formed, concentrically and zonally.

According to this aspect, the diffraction pattern is formed, concentrically and zonally, so that it is possible to efficiently provide the correction effect with respect to each laser light.

In another aspect of the first embodiment of the optical element, the diffraction pattern includes a first area with an outer diameter associated with the effective diameter R1, a second area with an outer diameter associated with the effective diameter R2, and a third area with an outer diameter associated with the effective diameter R3, the first area and the third area are provided with the second aberration correcting device, and the second area is provided with the third aberration correcting device.

According to this aspect, the first, second, and third areas are zonally formed such that each area has an outer diameter associated with the effective diameter of respective one of the laser lights. Thus, it is possible to efficiently provide the correction effect by each correcting device.

In another aspect of the first embodiment of the optical element, wavelength ranges of the first laser light, the second laser light, and the third laser light are 400 to 410 nm, 635 to 670 nm, and 780 to 810 nm, respectively.

According to this aspect, the wavelength ranges of the first, second, and third laser lights correspond to the wavelengths for information recording/reproduction of a BD (Blue Ray Disc), a DVD, and a CD (Compact Disc), respectively. Thus, it is possible to share the objective lens among these recording media.

In another aspect of the first embodiment of the optical element, the diffraction pattern is formed to maximize diffraction efficiency of $(10 \times n)$th-order diffracted light (n is an integer) of the first laser light in the first area and the third area, and the diffraction pattern is formed to maximize diffraction efficiency of $(5 \times (2n-1))$th-order (n is an integer) of the first laser light in the second area.

According to this aspect, out of the laser lights transmitted through the second area, the third laser light can be easily diffused.

In another aspect of the first embodiment of the optical element, the first aberration correcting device is formed on either one of the incident plane and the exit plane, and the second aberration correcting device and the third aberration correcting device are formed on another plane where the first aberration correcting device is not formed, out of the incident plane and the exit plane.

According to this aspect, the first aberration correcting device is formed on one side of the optical element, and the second and third aberration correcting deviced are formed on the other side. Thus, it is possible to efficiently obtain the effect of each aberration correcting device.

In another aspect of the first embodiment of the optical element, the first aberration correcting device, the second aberration correcting device, and the third aberration correcting device are formed either one of the incident plane and the exit plane.

According to this aspect, the first aberration correcting device, the second aberration correcting device, and the third aberration correcting device are formed on one side of the optical element, so that it is effective in the cost of production.

Second Embodiment of Optical Element

The second embodiment of the optical element is an optical element having an incident plane and an exit plane of first laser light and a plurality of laser lights, which has a different wavelength from that of the first laser light, on an optical path of the first laser light and the plurality of laser lights, in order to share an objective lens for focusing light on a first recording medium provided with a recording layer, which receives the first laser light through a transmission protection layer with a thickness of D1, in the plurality of laser lights and in a plurality of recording media corresponding to the respective plurality of laser lights, the plurality of laser lights including second laser light, corresponding to a second recording medium having a transmission protection layer with a thickness of D2 (D2>D1) and used in a finite system, and third laser light, corresponding to a third recording medium having a transmission protection layer with a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, the optical element provided with: a fourth aberration correcting device for correcting aberration of the objective lens caused by an amount of change if a wavelength is changed in the first laser light, the second laser light, or the third laser light; a fifth aberration correcting device, which is disposed in association with the effective diameter R1 and the effective diameter R2, for correcting aberration of the objective lens caused by an amount of change if a wavelength is changed in the first laser light and the third laser light and for selectively diffusing the incident second laser light if the second laser light enters the fifth aberration correcting device; and a sixth aberration correcting device, which is disposed in association with the effective diameter R2 and the effective diameter R3, for correcting aberration of the objective lens caused by an amount of change if a wavelength is changed in the first laser light and the second laser light and for selectively diffusing the incident third laser light if the third laser light enters the sixth aberration correcting device.

According to the optical element, by the fourth aberration correcting device, the aberration generated in the objective lens is corrected if a wavelength is changed in each laser lights. Moreover, by the fifth aberration correcting device, the second laser light is selectively diffused, and by the sixth aberration correcting device, the third laser light is selectively diffused. Thus, it is possible to share the objective lens in a simple structure among three or more recording media.

In one aspect of the second embodiment of the optical element, wavelength ranges of the first laser light, the second laser light, and the third laser light are 400 to 410 nm, 635 to 670 nm, and 780 to 810 nm, respectively, and each of the fourth aberration correcting device, the fifth aberration correcting device, and the sixth aberration correcting device is formed, concentrically and zonally, and is a diffraction pattern having a plurality of phase steps associated with a wavelength of respective one of the first laser light, the second laser light, and the third laser light.

According to the optical element, each correcting device is the zonally formed diffraction pattern, and the wavelengths of the first, second, and third laser lights correspond to the BD, the DVD, and the CD, respectively. Thus, it is possible to share the objective lens in a simple structure among the three recording media.

In another aspect of the second embodiment of the optical element, the diffraction pattern includes a fourth area with an outer diameter associated with the effective diameter R1, a fifth area with an outer diameter associated with the R1 and the R2, a sixth area with an outer diameter associated with the R2, a seventh area with an outer diameter associated with the R2 and the R3, and an eighth area with an outer diameter associated with the R3, the fourth area, the sixth area, and the eighth area are provided with the fourth aberration correcting device, the fifth area is provided with the fifth aberration correcting device, and the seventh area is provided with the sixth aberration correcting device.

According to the optical element, the zonal diffraction pattern, formed as the fourth, fifth, sixth, seventh, and eighth areas, is formed such that each area has an outer diameter associated with the effective diameter of respective one of the laser lights. Thus, it is possible to efficiently provide the correction effect by each correcting device.

In another aspect of the second embodiment of the optical element, the diffraction pattern is formed to maximize diffraction efficiency of (10×n)th-order diffracted light (n is an integer) of the first laser light in the fourth area, the six area, and the eighth area, the diffraction pattern is formed to maximize diffraction efficiency of (2×n)th-order (n is an integer other than multiples of 5) of the first laser light in the fifth area, and the diffraction pattern is formed to maximize diffraction efficiency of (5×(2n−1))th-order (n is an integer) of the first laser light in the seventh area.

According to the optical element, it is possible to easily diffuse the second laser light in the fifth area, and the third laser light in the seventh area.

In another aspect of the second embodiment of the optical element, the diffraction pattern includes a ninth area with an outer diameter associated with the effective diameter R1, a tenth area with an outer diameter associated with the R2, an eleventh area with an outer diameter associated with the R2 and the R3, and a twelfth area with an outer diameter associated with the R3, the tenth area and the twelfth area are provided with the fourth aberration correcting device, the ninth area is provided with the fifth aberration correcting device, and the eleventh area is provided with the sixth aberration correcting device.

According to the optical element, the zonal diffraction pattern, formed as the ninth, tenth, eleventh, and twelfth areas, is formed such that each area has an outer diameter associated with the effective diameter of respective one of the laser lights. Thus, it is possible to efficiently provide the correction effect by each correcting device.

In another aspect of the second embodiment of the optical element, the diffraction pattern is formed to maximize diffraction efficiency of (10×n)th-order diffracted light (n is an integer) of the first laser light in the tenth area and the twelfth area, the diffraction pattern is formed to maximize diffraction efficiency of (2×n)th-order (n is an integer other than multiples of 5) of the first laser light in the ninth area, and the diffraction pattern is formed to maximize diffraction efficiency of (5×(2n−1))th-order (n is an integer) of the first laser light in the eleventh area.

According to the optical element, it is possible to easily diffuse the second laser light in the ninth area, and the third laser light in the eleventh area.

In another aspect of the second embodiment of the optical element, the diffraction pattern includes a thirteenth area with an outer diameter associated with the effective diameter R1, a fourteenth area with an outer diameter associated with the R1 and the R2, a fifteenth area with an outer diameter associated with the R2, and a sixteenth area with an outer diameter associated with the R3, the thirteenth area and the sixteenth area are provided with the fourth aberration correcting device, the fourteenth area is provided with the fifth aberration correcting device, and the fifteenth area is provided with the sixth aberration correcting device.

According to the optical element, the zonal diffraction pattern, formed as the thirteenth, fourteenth, fifteenth, and sixteenth areas, is formed such that each area has an outer diameter associated with the effective diameter of respective one of the laser lights. Thus, it is possible to efficiently provide the correction effect by each correcting device.

In another aspect of the second embodiment of the optical element, the diffraction pattern is formed to maximize diffraction efficiency of (10×n)th-order diffracted light (n is an integer) of the first laser light in the thirteenth area and the sixteenth area, the diffraction pattern is formed to maximize diffraction efficiency of (2×n)th-order (n is an integer other than multiples of 5) of the first laser light in the fourteenth area, and the diffraction pattern is formed to maximize diffraction efficiency of (5×(2n−1))th-order (n is an integer) of the first laser light in the fifteenth area.

According to the optical element, it is possible to easily diffuse the second laser light in the fourteenth area, and the third laser light in the fifteenth area.

In another aspect of the second embodiment of the optical element, the diffraction pattern includes a seventeenth area with an outer diameter associated with the effective diameter R1, an eighteenth area with an outer diameter associated with the R2, and a nineteenth area with an outer diameter associated with the R3, the seventeenth area is provided with the fifth aberration correcting device, the eighteenth area is provided with the sixth aberration correcting device, and the nineteenth area is provided with the fourth aberration correcting device.

According to the optical element, the zonal diffraction pattern, formed as the seventeenth, eighteenth, and nineteenth areas, is formed such that each area has an outer diameter associated with the effective diameter of respective one of the laser lights. Thus, it is possible to efficiently provide the correction effect by each correcting device.

In another aspect of the second embodiment of the optical element, the diffraction pattern is formed to maximize diffraction efficiency of (10×n)th-order diffracted light (n is an integer) of the first laser light in the nineteenth area, the diffraction pattern is formed to maximize diffraction efficiency of (2×n)th-order (n is an integer other than multiples of 5) of the first laser light in the seventeenth area, and the diffraction pattern is formed to maximize diffraction efficiency of (5×(2n−1))th-order (n is an integer) of the first laser light in the eighteenth area.

According to the optical element, it is possible to easily diffuse the second laser light in the seventeenth area, and the third laser light in the eighteenth area.

<Embodiment of Optical Pickup>

The embodiment of the optical pickup is provided with the above-mentioned first or second embodiment of the optical element of the present invention.

According to the optical pickup, it is possible to use three ore more recording media.

<Embodiment of Optical Information Recording/Reproducing Apparatus>

The embodiment of the optical information recording/reproducing apparatus is provided with the above-mentioned optical pickup of the present invention.

According to the optical information recording/reproducing apparatus, it is possible to use three ore more recording media.

As explained above, the first embodiment of the optical element is provided with: the first aberration correcting device; the second aberration correcting device; and the third aberration correcting device. Thus, it is possible to share the objective lens in a simple structure among three or more recording media. The second embodiment of the optical element is provided with: the fourth aberration correcting device; the fifth aberration correcting device; and the sixth aberration correcting device. Thus, it is possible to share the objective lens in a simple structure among three or more recording media. According to the embodiment of the optical pickup, it is provided with the first or second embodiment of the optical element of the present invention. Thus, it is possible to use three ore more recording media. The embodiment of the optical information recording/reproducing apparatus is provided with the embodiment of the optical pickup of the present invention. Thus, it is possible to use three ore more recording media.

These effects and other advantages of the present invention become more apparent from the following examples.

EXAMPLES

Hereinafter, examples of the present invention will be discussed with reference to the drawings.

First Example

Structure and Operation of Optical Pickup

At first, the structure and the operation of an optical pickup in one example of the present invention, which includes an optical element in the first example of the present invention, will be explained with reference to FIG. 1. FIG. 1 is a diagram showing a structural example of an optical pickup 100.

In FIG. 1, the optical pickup 100 is an apparatus for recording and reading information with respect to three types of recording media, which are a BD, a DVD, and a CD.

The optical pickup 100 is provided with: a light source 101 for BD; a beam shaping lens 102; a dichroic mirror 103; a PBS (Polarized Beam Splitter) 104; a light source 105 for DVD; a coupling lens 106; a sensor lens 107 for BD/DVD; a detector 108 for BD/DVD; a collimator lens 109; a light source 110 for CD; a half mirror 111; a sensor lens 112 for CD; a detector 113 for CD; a coupling lens 114; a dichroic mirror 115; a ¼ wavelength plate 116; an optical element 10; and an objective lens 120. A luminous flux transmitted through the objective lens 120 focuses on the recording layer of the recording medium 200.

The light source 101 for BD is a light source for emitting laser light with a wavelength of 405 nm as being one example of the "first laser light" of the present invention. Moreover, the light source 105 for DVD is a light source for emitting laser light with a wavelength of 650 nm as being one example of the "second laser light" of the present invention. The light source 110 for CD is a light source for emitting laser light with a wavelength of 780 nm as being one example of the "third laser light" of the present invention. Incidentally, in the explanation described below, if not otherwise specified, the laser light with a wavelength of 405 nm emitted from the light source 101 for BD is referred to as the "first laser light", the laser light with a wavelength of 650 nm emitted from the light source 105 for DVD is referred to as the "second laser light", and the laser light with a wavelength of 780 nm emitted from the light source 110 for CD is referred to as the "third laser light".

The beam shaping lens 102 is a lens for shaping the first laser light to a circular cross-section and for supplying the first laser light after the shaping to the dichroic mirror 103. Moreover, the coupling lens 106 is a lens for supplying the second laser light, emitted from the light source 105 for DVD, to the dichroic mirror 103.

The dichroic mirror 103 is a mirror for reflecting the laser light with a particular wavelength, and here, it reflects the second light. Therefore, the first laser light and the second laser light which enter the dichroic mirror 103 continue to travel in the same direction and enter the PBS 104.

The PBS 104 transmits the first laser light and the second laser light which enter from the light source 101 for BD and the light source 105 for DVD, respectively, and supplies them to the collimator lens 109. The collimator lens 109 is a lens for converting the incident lights coming from the light sources to parallel light. The first laser light and the second laser light which are converted to the parallel light by the collimator lens enter the dichroic mirror 115.

Moreover, with respect to the reflected light coming from the recording medium 200, the PBS 104 converts its traveling direction to a direction of the sensor lens 107 for BD/DVD. In other words, the PBS 104 is equivalent to a device in which a dichroic mirror is formed on the side of the collimator lens 109. The sensor lens 107 for BD/DVD focuses the first laser light and the second laser light which enter from the PBS 104, on the detector 108 for BD/DVD. The detector 108 for BD/DVD detects the focused laser light. The detector 108 for BD/DVD is shared between the BD and the DVD.

On the other hand, the third laser light emitted from the light source 110 for CD enters the half mirror 111. The half mirror 111 has a mirror on one side. As in the PBS 104, the half mirror 111 transmits the laser light from the light source side, and reflects the laser light coming from the recording medium side, in a direction of the sensor lens 112 for CD. The sensor lens 112 for CD focuses the incident third laser light on the detector 113 for CD. The detector 113 for CD detects the focused laser light. The third laser light transmitted through the half mirror 111 enters the coupling lens 114. The coupling lens 114 is a lens for supplying the incident third laser light to the dichroic mirror 115.

Incidentally, the third laser light is divergent light which enters the dichroic mirror 115 without through the collimator lens 109. Therefore, the optical pickup 100 is a finite system only for the CD.

The dichroic mirror 115 is a mirror for reflecting only the first laser light and the second laser light, and can transmit the third laser light without influence. Therefore, in the end, the first laser light, the second laser light, and the third laser light all travel in the same direction. Each laser light is transmitted through the ¼ wavelength plate 116, and then enters the optical element 10. The detailed structure of the optical element 10 will be discussed later.

Each laser light transmitted through the optical element 10 enters the objective lens 120. The objective lens 120 is one example of the "objective lens" of the present invention, and is a lens for focusing the incident light on the recording layer of the recording medium 200.

The optical pickup 100 has the above-mentioned structure. Incidentally, the optical pickup 100 is basically an optical system for the BD, and is one example of the "optical pickup" of the present invention in which the compatibility with the DVD and the CD can be realized by the operation of the optical element 10.

Now, the recording medium 200 is explained with reference to FIG. 2. FIG. 2 is a schematic cross sectional view of the recording medium 200.

The recording medium 200 includes: a recording medium 200a which is the BD; a recording medium 200b which is the DVD; and a recording medium 200c which is the CD. The recording medium 200 has recording layers 210a, 210b, and 210c, which are one example of the "recording layer" of the present invention, in association with the recording media 200a, 200b, and 200c, respectively. In the recording layers 210a, 210b, and 210c, various information can be written and read by focusing thereon the first laser light, the second laser light, and the third laser light, respectively.

Moreover, between each recording layer and the objective lens 120, there are transmission protection layers 220a, 220b, and 220c, which are one example of the "transmission protection layer" of the present invention, in association with the recording media 200a, 200b, and 200c, respectively. The thickness of the transmission protection layers 220a, 220b, and 220c are 0.1 mm (i.e. one example of the "thickness D1" of the present invention), 0.6 mm (i.e. one example of the "thickness D2" of the present invention), and 1.2 mm (i.e. one example of the "thickness D3" of the present invention), respectively. Namely, the transmission protection layers 220a, 220b, and 220 are generally referred to as a substrate. In the optical pickup 100, the recording media 200a, 200b, and 200c are selected and used, as occasion demands.

<Structure of Optical Element 10>

Next, the detailed structure of the optical element 10 will be explained with reference to FIG. 3. FIG. 3 is a cross sectional view showing the optical element 10.

The optical element 10 is an optically-transparent member in which a plurality of holograms, which are one example of the "diffraction pattern" of the present invention, are formed on a plate-like base material 113 having an incident plane 11 and an exit plane 12 in a mild aspheric shape. The incident plane 11 is one example of the "incident plane" of the present invention, and is disposed with it directed to the opposite side of the objective lens 120 in the optical pickup 100. Moreover, the exit plane 12 is one example of the "exit plane" of the present invention, and is disposed to face the objective lens 120 in the optical pickup 100. The base material 13 is made of plastic, glass, or the like.

On the incident plane 11 of the optical element 10, there is formed a hologram 14 for spherical aberration correction. The hologram 14 for spherical aberration correction is a hologram for correcting spherical aberration caused by a difference in layer thickness between the transmission protection layers 220a and 220b, and spherical aberration caused by a difference in wavelength between the first laser light and the second laser light. The hologram 14 is one example of the "first aberration correcting device" of the present invention. As described above, the difference in layer thickness between the transmission protection layers 220a and 220b is 0.5 mm. Therefore, the hologram 14 for spherical aberration correction is formed to correct the spherical aberration corresponding to the difference of "0.5 mm", and the spherical aberration caused by the difference in wavelength between the first laser light and the second laser light, in other words, the spherical aberration caused by a difference in refractive index of the objective lens with respect to the first laser light and the second laser light.

Incidentally, the structure of the hologram 14 for spherical aberration correction is not limited to the above-mentioned aspect. The hologram 14 can have any shape if it can be formed on the optical element 10 and it can correct the spherical aberration caused by the difference in layer thickness of the transmission protection layers 220a and 220b and the spherical aberration caused by the difference in refractive index of the objective lens with respect to the first laser light and the second laser light. Moreover, on the outer side of an area where the hologram 14 for spherical aberration correction is formed, there may be formed nothing or another hologram. If another hologram is formed, it is preferable to construct it such that an unnecessary luminous flux does not focus on the recording medium by diffraction.

On the other hand, if a device for correcting the spherical aberration is not adopted, it is difficult that the second laser light which enters the incident plane 11 of the optical element 10 focuses on the recording layer of the recording medium, due to the enormous spherical aberration. Therefore, the area where the hologram 14 for spherical aberration correction is formed has a close relationship with the effective diameter of the second laser light.

As already described, the "effective diameter" of the present invention is a concept which indicates the diameter of the luminous flux which contributes the focusing by the objective lens. Thus, it is not necessarily defined on the objective lens. The effective diameter may be defined for the luminous flux which enters the optical element or which is emitted from the optical element. In other words, as long as defined in an equal condition to the first laser light, the second laser light, and the third laser light, the "effective diameter" is a concept which broadly indicates the diameter of the luminous flux focused in a spot (focus) range in the end which is defined by the objective lens for each recording medium.

The "effective diameter" has a large effect on a NA (Numerical Aperture) determined for each recording medium. In the same focal distance, as the diameter of the luminous flux which enters the objective lens 120 increases, the NA increases. Moreover, as the NA increases, the spot diameter decreases, and as the spot diameter decreases, the information can be recorded with higher density. The value of the NA is set in advance for each recording medium. Therefore, the effective diameter required for each recording medium is naturally determined. The value of the NA is defined as 0.85 in the BD, 0.6 in the DVD, and 0.45 in the CD. Therefore, the required effective diameter increases in order of the recording media 200a, 200b, and 200c.

Incidentally, the "NA" can be defined on either the material side (light source side) or the image point side (focal point side). The above-mentioned NA of each recording medium is the NA on the image point side.

In the example, the effective diameter required for the laser light is defined on the exit plane of the optical element 10, and it is "R1", "R2", and "R3" for the first laser light, the second laser light, and the third laser light, respectively. These correspond to the "effective diameter of the luminous flux required" in the present invention.

The hologram 14 for spherical aberration correction has a so-called "aperture limit" function of narrowing down the effective diameter of the second laser light such that the effective diameter of the second laser light which is introduced to the exit plane is "R2". The aperture limit is one example of the words "reducing . . . to a value corresponding to the effective diameter R2" in the present invention.

On the other hand, with respect to the third laser light, the layer thickness between the transmission protection layers 220a and 220c is 1.1 mm. Therefore, if the third laser light enters the optical element 10 by parallel light in the same manner as the first laser light and the second laser light, it is difficult to correct the spherical aberration caused by the difference in layer thickness. For this reason, the third laser light is used in the finite system, as described above, so that the divergent light enters the incident plane 11.

The degree of divergence of the divergent light is determined so as to cancel the spherical aberration caused by the difference in layer thickness. However, the spherical aberration corresponding to about 0.5 mm is corrected by the hologram 14 for spherical aberration correction, so that the spherical aberration necessary to be corrected by using the divergent light is namely an amount corresponding to about 0.6 mm.

In FIG. 3, a hologram 15 for chromatic aberration correction is formed on the exit plane 12.

The first laser light, the second laser light, and the third laser light are practically accompanied by some wavelength change. For example, when the output of the laser lights is changed, this type of wavelength change easily occurs. If the wavelength change occurs, a focus position changes back and forth in accordance with the amount of change when the laser light is transmitted through the objective lens 120 and is focused. In other words, chromatic aberration occurs. The hologram 15 for chromatic aberration correction is a hologram for correcting the chromatic aberration generated when the wavelength change occurs, as described above. As shown in an enlarged view in FIG. 3, a plurality of phase steps are formed in a staircase pattern. The depth of the phase steps is associated with the wavelength of each laser light. The depth of the phase steps will be described later.

The details of the hologram 15 for chromatic aberration correction will be explained with reference to FIG. 4. FIG. 4 is a plan view of the exit plane 12.

As shown in FIG. 4, in the hologram 15 for chromatic aberration correction, zonal areas A, B, and C are formed, concentrically, around the optical axis of the incident light (which is a central axis of the luminous flux and is the same for all the laser lights in the example).

The hologram 15 for chromatic aberration correction has such a shape that a plurality of phase steps associated with the wavelength of each laser light are formed in a staircase pattern, as described above. The phase steps are formed such that an optical path length difference in the laser light transmitted through each phase step is just an integral multiple of the wavelength in the first laser light. In the example, the phase steps are formed such that the optical path length difference is 10 wavelengths of the first laser light in the areas A and C and that the optical path length difference is 5 wavelengths of the first laser light in the area B.

Here, the optical path length difference of 10 wavelengths of the first laser light corresponds to an optical path length difference of 6 wavelengths of the second laser light, and corresponds to an optical path length difference of 5 wavelengths of the third laser light. Of course, since the wavelength of the first laser light is 405 nm, the wavelength of the second laser light is 650 nm, and the wavelength of the third laser light is 780 nm, strictly speaking, such a relationship does not hold true from wavelength ratio conversion. However, for example, in plastic and glass which can be the material of the optical element 10, as the wavelength becomes shorter, the refractive index increases. Thus, such a relationship substantially holds true in the material used in this application.

In other words, the "phase steps associated with each wavelength" described in the present invention is a concept not only which defines the phase steps having the optical path length difference which is strictly an integral multiple of the wavelength, but also which includes the phase steps having the optical path length difference which can practically behave as the integral multiple of the wavelength. Moreover, the aspect of the phase steps is not limited to the steps in the pattern described here. For example, the phase steps can be realized by refractive-index distribution. Furthermore, the aspect of the "association" of this type is arbitrary in a range in which the effect of the present invention can be ensured.

If the optical path length difference generated in the phase steps which are formed in the hologram 15 for chromatic aberration correction is an integral multiple of the wavelength, the emitted laser light does not have a phase difference, so that there is not any change at all on a wave front; namely, there is not any wavefront correction at all. Therefore, with respect to the laser light transmitted through the areas A and C, an influence does not appear on the wave front in all of the first laser light, the second laser light, and the third laser light, and the hologram 15 for chromatic aberration correction behaves as if it was merely a parallel plate.

Moreover, in the hologram 15 for chromatic aberration correction, the wavelength of the transmitted luminous flux correlates with a diffraction order. In other words, if the phase steps are designed to have the optical path length difference of 10 wavelengths of the first laser light, the diffraction efficiency of 10th-order diffracted light is maximal. In this case, the diffraction efficiency of 6th-order diffracted light is maximal in the second laser light, and the diffraction efficiency of 5th-order diffracted light is maximal in the third laser light.

If the wavelength of the laser light changes for some reasons which enters the hologram 15 for chromatic aberration correction with the structure, for example, if the wavelength of the first laser light changes by 1 nm, a diffraction angle changes in associated with this 1 nm. By canceling the amount of change of the diffraction angle and the amount of the chromatic aberration generated in the objective lens 120, the hologram 15 for chromatic aberration correction corrects the chromatic aberration of the objective lens 120. In other words, the hologram 15 for chromatic aberration correction is formed to allow the cancellation. Incidentally, it is obviously desirable that the chromatic aberration of the objective lens 120 is completely corrected; however, it is not necessarily completely corrected. Therefore, the hologram 15 for chromatic aberration correction may be designed to completely correct the chromatic aberration of the objective lens 120, or to correct the chromatic aberration to a degree that there is no problem in operation. Moreover, the chromatic aberration is generated in the collimator lens and the coupling lens or the like other than the object lens 120 in some cases, so that the hologram 15 for chromatic aberration correction may be designed to perform the correction including the above-mentioned chromatic aberration.

On the other hand, as described above, the required NA varies among the recording media, so that the required effective diameter varies among the laser lights. In the first laser light, there is no need to perform any correction since the optical pickup 100 is constructed for the BD; however, in the second laser light and the third laser light, it is necessary to perform some aperture limit. Out of them, in the second laser light, the aperture limit is performed by the hologram 14 for spherical aberration correction, and the effective diameter R2 to realize the NA required for the recording medium 200b is already ensured. However, the NA required for the recording medium 200c is much smaller than this, so if the spherical aberration is corrected in the third laser light up to the effective diameter corresponding to the second laser light, it is over-correction.

The area B of the hologram 15 for chromatic aberration correction is provided to perform the aperture limit with respect to the third laser light. As described already, the phase steps in the area B are formed to have the optical path length difference of 5 wavelengths of the first laser light. Therefore, in the area B, the optical path length difference is 3 wavelengths in the second laser light, and 2.5 wavelengths in the third laser light.

With respect to the first laser light and the second laser light which are transmitted through the area B, there is no influence on the wave front, and they behave like the luminous flux transmitted through the areas A and C. However, in the third laser light, 2nd-order diffracted light and 3rd-order diffracted light are generated, simultaneously. Moreover, a phase difference corresponding to how much the optical path length difference generated in the phase steps is shifted from an integral multiple of the wavelength is added to these diffracted lights as aberration by the hologram 15 for chromatic aberration correction. Thus, the third laser light transmitted through this area diffuses and does not focus on the recording layer 210c.

In the example, the inner diameter of the area B, i.e. the outer diameter of the area C, is formed to be the effective diameter R3 required for the third laser light. Therefore, the luminous flux which focuses on the recording layer 210c of the recording medium 200c in the end is only in a range of the effective diameter required for the third laser light, so that it is possible to perform the effective aperture limit with respect to the third laser light.

The hologram 15 for chromatic aberration correction is formed such that the outer diameter of the area A is R1, the outer diameter of the area B is R2, and the outer diameter of the area C is R3; namely, each area has the "outer diameter associated with the effective radius" of the present invention. Thus, the hologram 15 can correct the chromatic aberration and perform the aperture limit corresponding to the third recording medium 200c. In other words, the hologram 15 for chromatic aberration correction functions as one example of the "second aberration correcting device" of the present invention and one example of the "third aberration correcting device".

<Operation of Optical Element 10>

The operation of the optical element 10 having the above-mentioned structure will be discussed with reference to FIG. 5. FIG. 5 are diagrams illustrating the state of focusing of the first, second, and third laser lights. Incidentally, FIG. 5 show a slightly different focus locus from the actual locus so that the effect of the hologram 15 for chromatic aberration correction can be easily understood.

FIG. 5(a) shows the state of focusing of the first laser light. With respect to the first laser light, it is not subject to any aperture limit nor any wavefront correction, in either the hologram 14 for spherical aberration correction or the hologram 15 for chromatic aberration correction. Thus, the entire luminous flux which enters the objective lens 120 focuses on the recording layer 210a of the recording medium 200a.

FIG. 5(b) shows the state of focusing of the second laser light. With respect to the second laser light, the luminous flux transmitted through an unformed area where the hologram 14 for spherical aberration correction is not formed is diffused by the spherical aberration caused by the difference in layer thickness between the transmission protection layers 220a and 220b, and the spherical aberration caused by the difference in wavelength between the first laser light and the second laser light, so that it does not contribute to the focusing. However, the luminous flux transmitted through the hologram 14 for spherical aberration correction does not receive any wavefront correction effect when transmitted through the hologram 15 for chromatic aberration correction, so that it focuses on the recording layer 210b of the recording medium 200b.

FIG. 5(c) shows the state of focusing of the third laser light. With respect to the third laser light, the luminous flux transmitted through an unformed area where the hologram 14 for spherical aberration correction is not formed is diffused because the spherical aberration caused by the difference in layer thickness between the transmission protection layers 220a and 220c, and the spherical aberration caused by the difference in wavelength between the first laser light and the third laser light cannot be completely corrected by the aberration correction effect in the finite system, so that it does not contribute to the focusing. Moreover, out of the luminous flux transmitted through the hologram 14 for spherical aberration correction, the luminous flux transmitted through the area B of the hologram 15 for chromatic aberration correction is diffused by diffraction and does not contribute to the focusing. Therefore, in the end, only the luminous flux transmitted through the area C of the hologram 15 for chromatic aberration correction focuses on the recording layer 210c of the recording medium 200c.

As explained above, in the optical element 10 in the example, the objective lens 120 can be shared with respect to the three types of recording media for reading and writing the information by using the three types of laser lights with different wavelengths. Therefore, even in the optical pickup 100 equipped with the optical element 10, the objective lens 120 can be shared. Moreover, this effect is ensured even in an optical information recording/reproducing apparatus provided with the optical pickup 100. As one example of the optical information recording/reproducing apparatus, there is listed a composite drive unit which can perform the reproduction of the BD, the DVD, and the CD or the like.

Moreover, by adopting the concept disclosed in the example, it is also possible to easily realize the sharing of the objective lens in more number of recording media.

Incidentally, in the example, the hologram 14 for spherical aberration correction and the hologram 15 for chromatic aberration correction are formed separately on the incident plane 11 and the exit plane 12 in the optical element 10. However, the holograms may be combined to have the both effects and formed on one plane.

Moreover, as a preferable example when the holograms are combined on one plane as described above, if the combination of the holograms causes an extremely narrow pitch between the phase steps, the phase steps may be averaged and formed as phase steps combined in advance.

Incidentally, the hologram in the example may be formed directly in the objective lens. The objective lens in which the hologram is formed in this manner is also in the scope of the "optical element" of the present invention.

Second Example

In the above-mentioned optical element 10 in the first example, the spherical aberration is corrected by the hologram 14 for spherical aberration correction. If the spherical aberration can be corrected by making the second laser light in a form of divergent light in the finite system, as in the third laser light, the hologram for spherical aberration correction is unnecessary, and it is possible to make the optical element with a simple structure. Here, the second example of the present invention having this type of structure will be explained.

At first, the structure of an optical pickup in one example of the present invention, including the optical element in the second example of the present invention, will be discussed with reference to FIG. 6. FIG. 6 is a diagram showing a structural example of an optical pickup 300. Incidentally, the same points as those in FIG. 1 carry the same numerical references and the explanation thereof is omitted.

The point that the optical pickup 300 is different from the optical pickup 100 is that the second laser light is used in the finite system. As the second laser is used in a form of divergent light, only the first laser light enters the PBS 104. The sensor lens 107 for BD/DVD and the detector 108 for BD/DVD are changed to a sensor lens 301 for BD and a detector 302 for BD, respectively.

Moreover, the second laser light emitted from the light source 105 for DVD enters the dichroic mirror 103 through a PBS 303 and a coupling sensor 304. The dichroic mirror 103 is disposed at a different position from the case of the optical pickup 100; however, its operation is the same. Moreover, from the PBS 303, the second laser light enters a sensor lens 305 for DVD and a detector 306 for DVD which are newly provided.

On the other hand, the third laser light emitted from the light source 110 for CD is transmitted through the half mirror 111 as in the first embodiment; however, the dichroic mirror 103 is provided in the subsequent stage of the half mirror 111, and the third laser light joins the second laser light there, and enters a dichroic mirror 307. The dichroic mirror 307 is a mirror for selectively reflecting only the first laser light.

An optical element 20 in the example is disposed at a position facing the objective lens 120. Here, the optical element 20 will be explained with reference to FIG. 7 and FIG. 8. FIG. 7 are cross sectional views showing the optical element 20. FIG. 8 are plan views showing a hologram 23 for chromatic aberration correction.

In FIG. 7(a), the optical element 20 has an incident plane 21 and an exit plane 22, and the exit plane 22 faces the objective lens 120. As opposed to the first example, the exit plane 22 is a plate-like plane on which any hologram is not formed. On the other hand, in an aspherically bored portion of the incident plane 21, there is formed the hologram 23 for chromatic aberration correction. The hologram 23 for chromatic aberration correction is basically a hologram in which phase steps are formed in a staircase pattern, as in the hologram 15 for chromatic aberration correction. The aspect of division of areas and the depth of the phase steps in each area are different from those in the first example.

In FIG. 8(a), the hologram 23 for chromatic aberration correction is provided with areas D, E, F, G, and H which are concentrically formed as in the first example. Moreover, the area D is one example of the "fourth area" of the present invention, in which the outer diameter thereof corresponds to the effective diameter required for the first laser light, i.e. "R1". The area E is one example of the "fifth area" of the present invention, in which the outer diameter thereof has an intermediate size of "R1" and the effective diameter required for the second laser light of "R2". Moreover, the area F is one example of the "sixth area" of the present invention, in which the outer diameter thereof corresponds to "R2". The area G is one example of the "seventh area" of the present invention, in which the outer diameter thereof is slightly smaller than "R2". The area H is one example of the "eighth area" of the present invention, in which the outer diameter thereof corresponds to the effective diameter required for the third laser light of "R3".

In the areas D, F, and H of the hologram 23 for chromatic aberration correction, the phase steps are formed to cause the optical path length difference of 10 wavelengths of the first laser light. In the same manner, the phase steps are formed to cause 2 wavelengths in the area E, and 5 wavelengths in the area G. In the areas D, F, and H, there is the same hologram as that in the areas A and C in the first example, so that any wavefront correction is not performed in the laser light transmitted through these areas, with respect to all of the first, second, and third laser lights. In other words, the hologram formed in the areas functions as one example of the "fourth aberration correcting device" of the present invention.

The entire hologram 23 for chromatic aberration correction is formed to have the optical path length difference which is an integral multiple of the wavelength of the first laser light, so that if the first laser light enters this hologram, any wavefront correction is not performed.

On the other hand, if the second laser light enters the hologram 23 for chromatic aberration correction, there arise an optical length path difference of 6 wavelengths in the phase steps of the areas D, F, and H and an optical length path difference of 3 wavelengths in the phase steps of the area G. However, in the both case, the optical path length difference is substantially an integral multiple of the wavelength, so that the wave front is not influenced. As opposed to this, the optical path length difference generated in the phase steps of the area E corresponds to 1.2 wavelengths. Therefore, in this area, the second laser light is divided into 1st-order diffracted light and 2nd-order diffracted light, and is diffused because a phase difference corresponding to how much the optical path length difference generated in the phase steps is shifted from an integral multiple of the wavelength is added to the wave front of each diffracted light as aberration. Therefore, the second laser light transmitted through the area E does not focus on the recording layer 210b. In the example, the spherical aberration caused by the difference in layer thickness between the transmission protection layers 210a and 210b and the spherical aberration caused by the difference in wavelength between the first laser light and the second laser light are corrected only by making the second laser light in a form of divergent light without any correcting device. Thus, it is necessary to realize the aperture limit function for the second laser light, which is owned by the hologram 14 for spherical aberration correction in the first example, in the hologram 23 for chromatic aberration correction. This is why the area E is provided, and the area E is one example of the "fifth aberration correcting device" of the present invention in which the aperture limit can be performed by selectively diffusing only the second laser light.

Incidentally, in the case where the aberration is corrected with the second laser light as the divergent light, a certain amount of spherical aberration is corrected in some cases, even on the outer side of the effective diameter R2, depending on the specification of the objective lens. For example, with respect to the second laser light, a certain amount of spherical aberration is corrected in some cases, up to the effective diameter R1. In this case, as shown in FIG. 7(b) and FIG. 8(b), and FIG. 7(d) and FIG. 8(d), the outer diameter of the area E is preferably set to R1 so that there is no area D. Here, in FIG. 7(b) and FIG. 8(b), the areas E, F, G, and H are one example of the "ninth area", the "tenth area", the "eleventh area", and the "twelfth area" of the present invention, respectively. Moreover, in FIG. 7(d) and FIG. 8(d), the areas E, G, and H are one example of the "seventeenth area", the "eighteenth area", and the "nineteenth area" of the present invention, respectively.

In FIG. 7(a) and FIG. 8(a) again, if the third laser light enters the hologram 23 for chromatic aberration correction, there is an optical path length difference of 5 wavelengths in the phase steps in each of the areas D, F, and H, and there is an optical path length difference of 2 wavelengths in the phase steps in the area E. However, since in the both case, the optical path length difference is substantially an integral multiple of the wavelength, so that the wave front is not influenced. As opposed to this, the optical path length difference generated in the phase steps of the area G corresponds to 2.5 wavelengths. Therefore, the third laser light which enters this area is divided into 2nd-order diffracted light and 3rd-order diffracted light, and is diffused because a phase difference corresponding to how much the optical path length difference generated in the phase steps is shifted from an integral multiple of the wavelength is added to the wave front of each diffracted light as aberration. Therefore, the third laser light transmitted through the area G does not focus on the recording layer 210c. Incidentally, in the example, the spherical aberration caused by the difference in layer thickness between the transmission protection layers 210a and 210c and the spherical aberration caused by the difference in wavelength between the first laser light and the third laser light are corrected only by making the third laser light in a form of divergent light. Thus, the third laser light is relatively acute-angled diffused light for correcting spherical aberration of about 1.1 mm. Therefore, an outer area of the area G (i.e. the areas F, E, and D) becomes flared without any aperture limit. The area G means an area which is on the outer side of the effective diameter R3 and in which the spherical aberration is corrected by a certain amount. The hologram formed in this area functions as one example of the "sixth aberration correcting device" of the present invention.

Incidentally, in the case where the aberration is corrected with the third laser light as the divergent light, a certain amount of spherical aberration is corrected in some cases, even on the outer side of the effective diameter R3, depending on the specification of the objective lens. For example, with respect to the third laser light, a certain amount of spherical aberration is corrected in some cases, in a range of the effective diameter R2 or more. In this case, as shown in FIG. 7(c) and FIG. 8(c), and FIG. 7(d) and FIG. 8(d), the outer diameter of the area G is preferably set to R2 so that there is no area F. Incidentally, if the outer diameter of the area G is remarkably larger than R2, the range of the aperture limit effect is changed with respect to the second laser light, which is not preferable. Therefore, in this case, the outer diameter of the area G is preferably about R2 at most. Here, in FIG. 7(c) and FIG. 8(c), the areas D, E, G, and H are one example of the "thirteenth area", the "fourteenth area", the "fifteenth area", and the "sixteenth area" of the present invention, respectively.

The operation of the optical element 20 having the above-mentioned structure will be discussed with reference to FIG. 9. FIG. 9 are diagrams illustrating the state of focusing of the first, second, and third laser lights. Incidentally, FIG. 9 show a slightly different focus locus from the actual locus so that the effect of the hologram 23 for chromatic aberration correction can be easily understood.

FIG. 9(a) shows the state of focusing of the first laser light. With respect to the first laser light, any wavefront correction is not imposed by the hologram 23 for chromatic aberration correction. Thus, the entire luminous flux which enters the objective lens 120 focuses on the recording layer 210a of the recording medium 200a.

FIG. 9(b) shows the state of focusing of the second laser light. With respect to the second laser light, out of the luminous flux transmitted through the hologram 23 for chromatic aberration correction, only the luminous flux transmitted through the area E is selectively diffused. Moreover, with respect to the area D, it is difficult to completely correct the spherical aberration even by making the second laser light in a form of diffused light, so that due to the spherical aberration caused by the difference in layer thickness between the transmission protection layers 220a and 220b, the luminous flux transmitted through this area does not focus on the recording layer 210b. In other words, with respect to the second laser light, one portion of the luminous flux transmitted through the outer area of the effective diameter R2 is diffused by the spherical aberration, and the rest portion is diffused by diffraction. Only the luminous flux transmitted in the effective diameter R2 focuses on the recording layer 210b.

FIG. 9(c) shows the state of focusing of the third laser light. With respect to the third laser light, out of the luminous flux transmitted through the hologram 23 for chromatic aberration correction, only the luminous flux transmitted through the area G is selectively diffused. Moreover, in the outer area of the area G, it is diffused by the spherical aberration. In other words, with respect to the third laser light, one portion of the luminous flux transmitted through the outer area of the effective diameter R3 is diffused by the spherical aberration, and the rest portion is diffused by diffraction. Only the luminous flux transmitted in the effective diameter R3 focuses on the recording layer 210c.

Incidentally, in the example, the effective diameters of the first, second, and third laser lights are expressed as "R1", "R2", and "R3", as in the first example; however, they are not the same in a narrow sense because the structure of the optical system is different. Namely, the same numerical references as those in the first example are daringly used to simplify the explanation. As described already, in the targeted optical system, the effective diameter which can realize the NA required for the recording medium in the end is the concept of the "effective diameter required".

Incidentally, the present invention is not limited to the above-described example, and various changes may be made, if desired, without departing from the essence or spirit of the invention which can be read from the claims and the entire specification. An optical element, an optical pickup, and an optical information recording/reproducing apparatus, all of which involve such changes, are also intended to be within the technical scope of the present invention.

INDUSTRIAL APPLICABILITY

The optical element, the optical pickup, and the optical information recording/reproducing apparatus according to the present invention can be applied to an optical element, an optical pickup, and an optical information recording/reproducing apparatus, in which an objective lens can be shared with respect to three or more types of recording media, for example.

The invention claimed is:

1. An optical element having an incident plane and an exit plane for first laser light and a plurality of other laser lights, each of which has a different wavelength from that of the first laser light, on an optical path of the first laser light and the other laser lights, in order to share an objective lens for focusing light on a first recording medium comprising a recording layer, which receives the first laser light through a transmission protection layer having a thickness of D1 and on a plurality of recording media corresponding to the other respective laser lights, the plurality of laser lights including second laser light, corresponding to a second recording medium including a transmission protection layer having a thickness of D2 (D2>D1), and third laser light, corresponding to a third recording medium including a transmission protection layer having a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, said optical element comprising:

a first aberration correcting device for correcting aberration caused by a difference between the thickness D1 of the transmission protection layer of the first recording medium and the thickness D2 of the transmission protection layer of the second recording medium and aberration caused by a difference in wavelength between the first laser light and the second laser light and for selectively reducing the effective diameter of the luminous flux which enters the objective lens to the effective diameter R2, with respect to the second laser light and the third laser light;

a second aberration correcting device for correcting aberration of the objective lens caused by wavelength changes in the first laser light, the second laser light, or the third laser light; and a third aberration correcting device, which is disposed between the effective diameter R2 and the effective diameter R3, for correcting aberration of the objective lens caused by wavelength changes in the first laser light and the second laser light and for selectively diffusing the incident third laser light if the third laser light enters said third aberration correcting device, wherein at least one of said second and third aberration correcting devices is a diffraction pattern in which a plurality of phase steps are formed in association with each wavelength of the first laser light, the second laser light, and the third laser light;

wherein the diffraction pattern is formed, concentrically and zonally;

wherein the diffraction pattern includes a first area with an outer diameter associated with the effective diameter R1, a second area with an outer diameter associated with the effective diameter R2, and a third area with an outer diameter associated with the effective diameter R3, the first area and the third area comprise said second aberration correcting device, and the second area comprises said third aberration correcting device;

wherein wavelength ranges of the first laser light, the second laser light, and the third laser light are 400 to 410 nm, 635 to 670 nm, and 780 to 810 nm, respectively;

wherein the diffraction pattern is formed to maximize diffraction efficiency of $(10 \times n)$th-order diffracted light (n is an integer) of the first laser light in the first area; the diffraction pattern is formed to maximize diffraction efficiency of $(5 \times (2n-1))$th-order (n is an integer) of the first laser light in the second area; and the diffraction pattern is formed to maximize diffraction efficiency of $(10 \times n)$th-order diffracted light (n is an integer) of the first laser light in the third area; and wherein the first area, the second area and the third area are non-overlapping.

2. The optical element according to claim 1, wherein said first aberration correcting device is formed on either one of the incident plane and the exit plane, and said second aberration correcting device and said third aberration correcting device are formed on the one of the incident plane and the exit plane where said first aberration correcting device is not formed.

3. The optical element according to claim 1, wherein said first aberration correcting device, said second aberration correcting device, and said third aberration correcting device are formed on either one of the incident plane and the exit plane.

4. An optical pickup comprising an optical element, wherein said optical element has an incident plane and an exit plane for first laser light and a plurality of other laser lights, each of which has a different wavelength from that of the first laser light, on an optical path of the first laser light and the other laser lights, in order to share an objective lens for focusing light on a first recording medium comprising a recording layer, which receives the first laser light through a transmission protection layer having a thickness of D1 and on a plurality of recording media corresponding to the other respective laser lights, the plurality of laser lights including second laser light, corresponding to a second recording medium including a transmission protection layer having a thickness of D2 (D2>D1), and third laser light, corresponding to a third recording medium including a transmission protection layer having a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, said optical element comprising:

a first aberration correcting device for correcting aberration caused by a difference between the thickness D1 of the transmission protection layer of the first recording medium and the thickness D2 of the transmission protection layer of the second recording medium and aberration caused by a difference in wavelength between the first laser light and the second laser light and for selectively reducing the effective diameter of the luminous flux which enters the objective lens to the effective diameter R2, with respect to the second laser light and the third laser light;

a second aberration correcting device for correcting aberration of the objective lens caused by wavelength changes in the first laser light, the second laser light, or the third laser light; and a third aberration correcting device, which is disposed between the effective diameter R2 and the effective diameter R3, for correcting aberration of the objective lens caused by wavelength changes in the first laser light and the second laser light and for selectively diffusing the incident third laser light if the third laser light enters said third aberration correcting device, wherein at least one of said second and third aberration correcting devices is a diffraction pattern in which a plurality of phase steps are formed in association with each wavelength of the first laser light, the second laser light, and the third laser light;

wherein the diffraction pattern is formed, concentrically and zonally;

wherein the diffraction pattern includes a first area with an outer diameter associated with the effective diameter R1, a second area with an outer diameter associated with the effective diameter R2, and a third area with an outer diameter associated with the effective diameter R3, the first area and the third area comprise said second aberration correcting device, and the second area comprises said third aberration correcting device;

wherein wavelength ranges of the first laser light, the second laser light, and the third laser light are 400 to 410 nm, 635 to 670 nm, and 780 to 810 nm, respectively;

wherein the diffraction pattern is formed to maximize diffraction efficiency of $(10\times n)$th-order diffracted light (n is an integer) of the first laser light in the first area; the diffraction pattern is formed to maximize diffraction efficiency of $(5\times(2n-1))$th-order (n is an integer) of the first laser light in the second area; and the diffraction pattern is formed to maximize diffraction efficiency of $(10\times n)$th-order diffracted light (n is an integer) of the first laser light in the third area; and wherein the first area, the second area and the third area are non-overlapping.

5. An optical information recording/reproducing apparatus comprising an optical pickup including an optical element, wherein said optical element has an incident plane and an exit plane for first laser light and a plurality of other laser lights, each of which has a different wavelength from that of the first laser light, on an optical path of the first laser light and the other laser lights, in order to share an objective lens for focusing light on a first recording medium comprising a recording layer, which receives the first laser light through a transmission protection layer having a thickness of D1 and on a plurality of recording media corresponding to the other respective laser lights, the plurality of laser lights including second laser light, corresponding to a second recording medium including a transmission protection layer having a thickness of D2 (D2>D1), and third laser light, corresponding to a third recording medium including a transmission protection layer having a thickness of D3 (D3>D2) and used in a finite system, an effective diameter of a luminous flux required when the first laser light, the second laser light, and the third laser light enter the objective lens being R1, R2 (R1>R2), and R3 (R2>R3), respectively, said optical element comprising:

a first aberration correcting device for correcting aberration caused by a difference between the thickness D1 of the transmission protection layer of the first recording medium and the thickness D2 of the transmission protection layer of the second recording medium and aberration caused by a difference in wavelength between the first laser light and the second laser light and for selectively reducing the effective diameter of the luminous flux which enters the objective lens to the effective diameter R2, with respect to the second laser light and the third laser light;

a second aberration correcting device for correcting aberration of the objective lens caused by wavelength changes in the first laser light, the second laser light, or the third laser light; and a third aberration correcting device, which is disposed between the effective diameter R2 and the effective diameter R3, for correcting aberration of the objective lens caused by wavelength changes in the first laser light and the second laser light and for selectively diffusing the incident third laser light if the third laser light enters said third aberration correcting device, wherein at least one of said second and third aberration correcting devices is a diffraction pattern in which a plurality of phase steps are formed in association with each wavelength of the first laser light, the second laser light, and the third laser light;

wherein the diffraction pattern is formed, concentrically and zonally;

wherein the diffraction pattern includes a first area with an outer diameter associated with the effective diameter R1, a second area with an outer diameter associated with the effective diameter R2, and a third area with an outer diameter associated with the effective diameter R3, the first area and the third area comprise said second aberration correcting device, and the second area comprises said third aberration correcting device;

wherein wavelength ranges of the first laser light, the second laser light, and the third laser light are 400 to 410 nm, 635 to 670 nm, and 780 to 810 nm, respectively;

wherein the diffraction pattern is formed to maximize diffraction efficiency of $(10\times n)$th-order diffracted light (n is an integer) of the first laser light in the first area; the diffraction pattern is formed to maximize diffraction efficiency of $(5\times(2n-1))$th-order (n is an integer) of the first laser light in the second area; and the diffraction pattern is formed to maximize diffraction efficiency of $(10\times n)$th-order diffracted light (n is an integer) of the first laser light in the third area; and wherein the first area, the second area and the third area are non-overlapping.

6. An optical element for use in an optical pickup configured to record and/or reproduce information on a first optical recording medium, which includes a transmission protection layer having a thickness D1, using a first laser light of a first wavelength having an associated luminous flux R1, to record and/or reproduce information on a second optical recording medium, which includes a transmission protection layer having a thickness D2 (D2>D1), using a second laser light of a second wavelength having an associated luminous flux R2 (R1>R2), and to record and/or reproduce information on a third optical recording medium, which is for a finite system and includes a transmission protection layer having a thickness D3 (D3>D2), using a third laser light of a third wavelength having an associated luminous flux R3 (R2>R3), the optical element comprising:

a first aberration correcting device configured to correct aberration caused by a difference between the thickness D1 of the transmission protection layer of the first recording medium and the thickness D2 of the transmission protection layer of the second recording medium and aberration caused by a difference in wavelength between the first laser light and the second laser light and to selectively reduce an effective luminous flux diameter, with respect to the second laser light and the third laser light, to the same effective diameter R2;

a second aberration correcting device configured to correct objective lens aberration caused by wavelength changes in the first laser light, the second laser light, or the third laser light; and a third aberration correcting device, which is disposed between the effective diameter R2 and the effective diameter R3, configured to correct objective lens aberration caused by wavelength changes in the first laser light and the second laser light and for selectively diffusing the third laser light incident thereon, wherein at least one of said second and third aberration correcting devices is a diffraction pattern in which a plurality of phase steps are formed in association with each wavelength of the first laser light, the second laser light, and the third laser light;

wherein the diffraction pattern is formed, concentrically and zonally;

wherein the diffraction pattern includes a first area with an outer diameter associated with the effective diameter R1, a second area with an outer diameter associated with the effective diameter R2, and a third area with an outer diameter associated with the effective diameter R3, the first area and the third area comprise said second aberration correcting device, and the second area comprises said third aberration correcting device;

wherein wavelength ranges of the first laser light, the second laser light, and the third laser light are 400 to 410 nm, 635 to 670 nm, and 780 to 810 nm, respectively;

wherein the diffraction pattern is formed to maximize diffraction efficiency of (10×n)th-order diffracted light (n is an integer) of the first laser light in the first area; the diffraction pattern is formed to maximize diffraction efficiency of (5×(2n−1))th-order (n is an integer) of the first laser light in the second area; and the diffraction pattern is formed to maximize diffraction efficiency of (10×n)th-order diffracted light (n is an integer) of the first laser light in the third area; and wherein the first area, the second area and the third area are non-overlapping.

7. An optical pickup comprising the optical element of claim 6.

8. An apparatus comprising the optical pickup of claim 7.

* * * * *